Jan. 15, 1957 E. WILDHABER 2,777,307
UNIVERSAL JOINT
Filed May 27, 1953 4 Sheets-Sheet 1
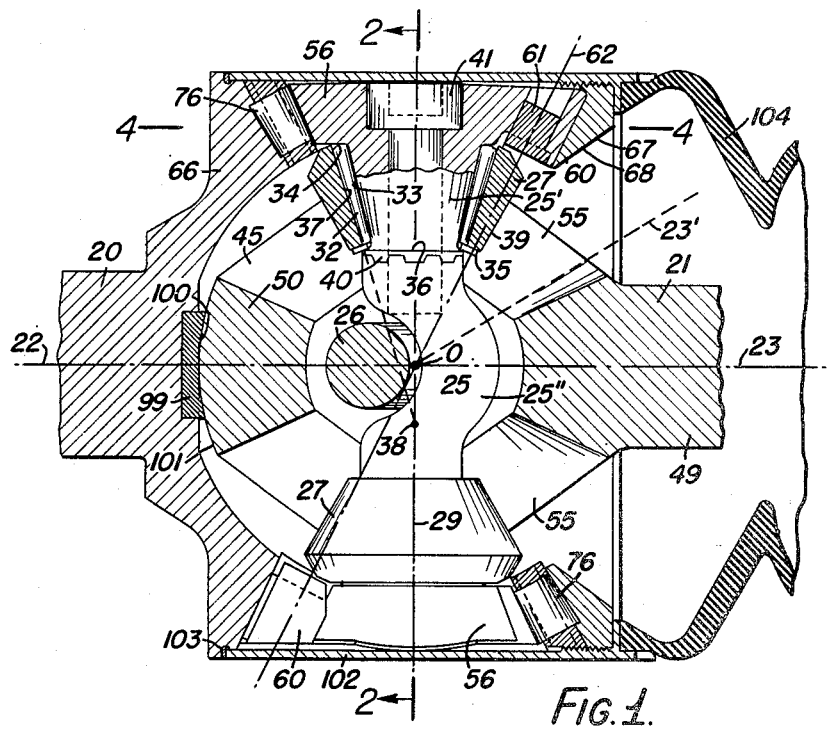
INVENTOR.
ERNEST WILDHABER
BY
ATTORNEY

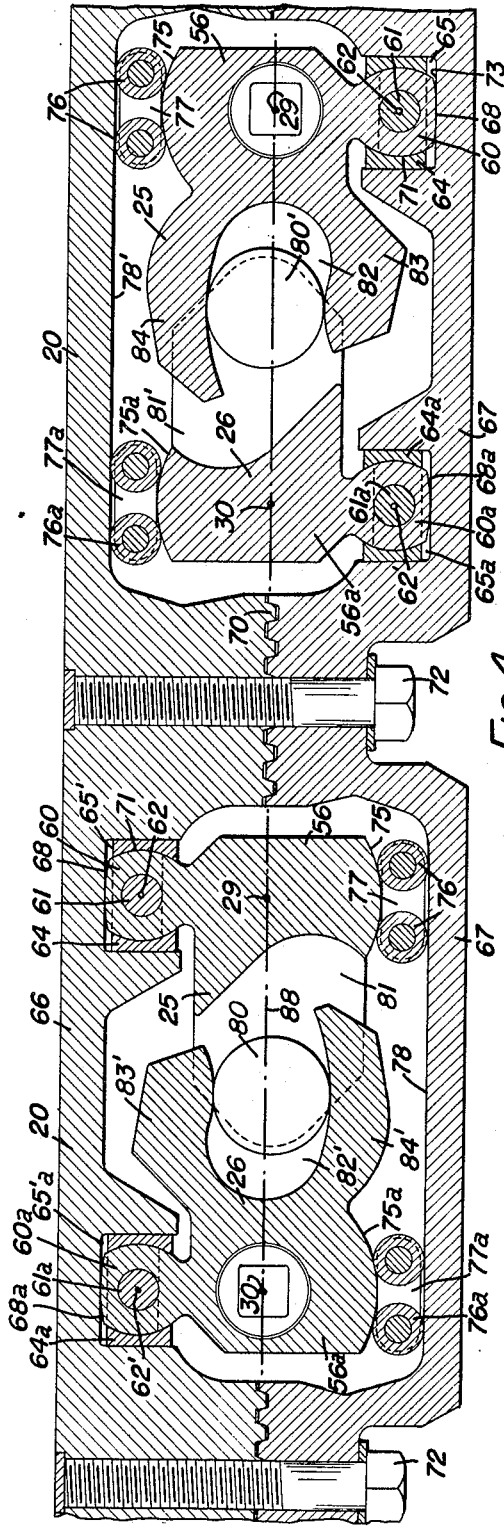
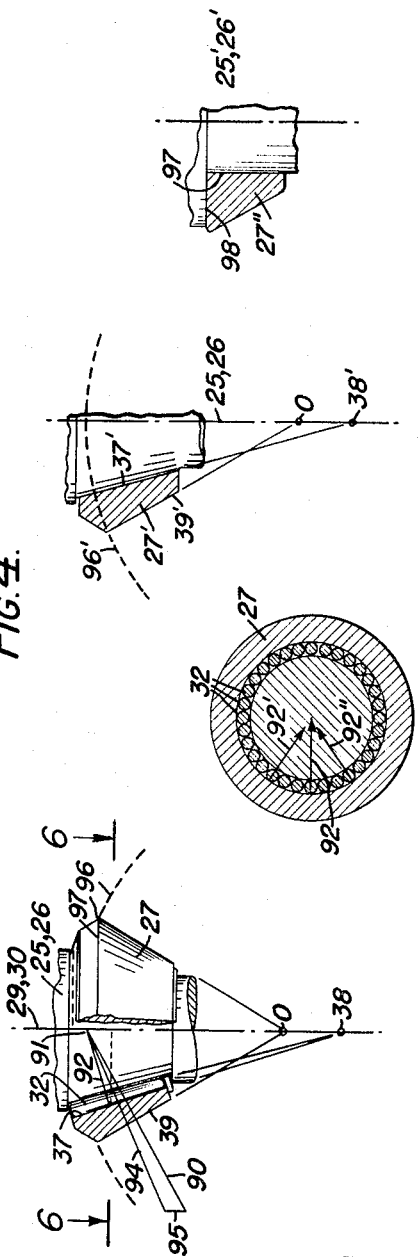
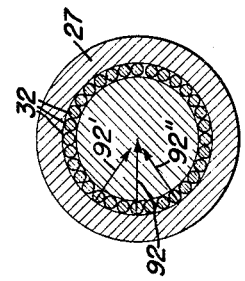
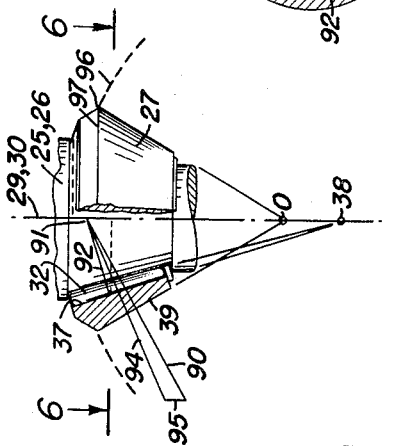

Jan. 15, 1957   E. WILDHABER   2,777,307
UNIVERSAL JOINT

Filed May 27, 1953   4 Sheets-Sheet 3

INVENTOR.
ERNEST WILDHABER
BY
ATTORNEY

Jan. 15, 1957  E. WILDHABER  2,777,307
UNIVERSAL JOINT

Filed May 27, 1953  4 Sheets-Sheet 4

INVENTOR.
ERNEST WILDHABER
BY
ATTORNEY

United States Patent Office 2,777,307
Patented Jan. 15, 1957

2,777,307
UNIVERSAL JOINT
Ernest Wildhaber, Rochester, N. Y.

Application May 27, 1953, Serial No. 357,818

11 Claims. (Cl. 64—21)

The present invention relates to universal joints, and more particularly to universal joints capable of transmitting substantially uniform motion. Such joints are usually referred to as constant velocity universal joints.

One object of the present invention is to provide a strong and very compact universal joint of the constant velocity type.

Another object of the invention is to provide a constant velocity universal joint which will not heat up and which is practically free from wear.

A further object of the invention is to provide a constant velocity universal joint in which power is transmitted largely through rolling contact.

Another object of the invention is to provide a constant velocity universal joint which is self-centering, and which does not require added structure to attain this end.

A further object of the invention is to provide a constant velocity universal joint capable of lasting as long as the vehicle, on which it is used, without repair and with a minimum of attention.

Other objects of the invention will be apparent hereinafter from the specification and form the recital of the appended claims.

In the drawings:

Fig. 1 is an axial section of a universal joint constructed according to one embodiment of the present invention.

Fig. 2 is a section through the joint taken substantially on the line 2—2 of Fig. 1;

Fig. 3 is a perspective view of one of the blocks used for connecting the connecting members of the joint to one end member of the joint;

Fig. 4 is a somewhat diagrammatic development to a plane of a cylindrical section along the line 4—4 of Fig. 1 and coaxial with the end member shown at the left in Fig. 1;

Fig. 5 is a part elevation, part axial section showing one of the tapered rollers of the joint, and part of its holder;

Fig. 6 is a section taken on the line 6—6 of Fig. 5;

Fig. 7 is a fragmentary axial section showing a modified roller mounting;

Fig. 8 is a fragmentary axial section of a further modified form of roller and mounting;

Figure 9:
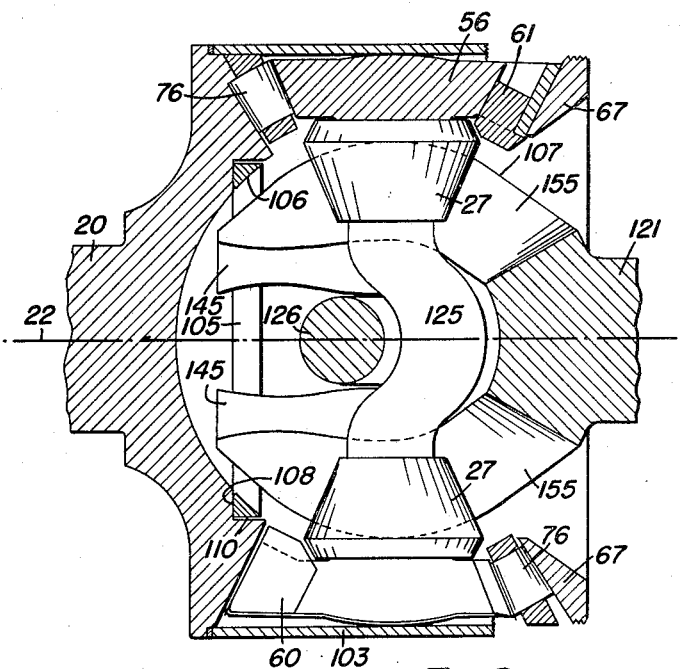
Fig. 9 is an axial section, similar to Fig. 1, showing a modified embodiment of the invention.

A universal joint constructed according to the present invention contains a plurality of connecting members or holders, preferably two. Each holder preferably supports rotatably a pair of diametrically opposite coaxial rollers, although sliding blocks or other pivoted parts may be used in place of rollers. The connecting members or holders operatively connect the two end members of the joint. The connecting members are disposed with their roller or pivotal support axes in a plane perpendicular to the axis of one end member of the universal joint, at least in the central position of the joint at zero angularity of the axes of the end member. The rollers or pivoted parts of the connecting members engage ways provided in the other end member. Each connecting member is so movable relative to the first end member as to tilt with respect to the central plane of rotation of said first end member. This plane is perpendicular to the axis of said first end member and passes through the point of intersection of the axes of the two end members. With this motion the roller axis moves in said plane or at least in the general direction of said plane. This motion can be considered as the aggregate of an infinite number of infinitesimal turning motions, each being a turning motion about an axis inclined at an acute angle to said central plane of rotation. Said acute angle is preferably held smaller than 30°. The smaller the angle, the more rigid is the support, but also the larger will be the turning angle of the holder at a given shaft angularity. It may also be said that at any one instant the motion of the holder relative to said other end member is an instantaneous motion about an axis inclined to said central plane of rotation.

In accordance with my invention the holders engage each other. This engagement constrains the two holders to have equal and opposite rotations, and equal and opposite tilts with respect to the central plane of rotation. There is one contact for pressure in one direction of rotation, and another contact for pressure in the opposite direction. In the middle position of oscillation, the engagement is preferably adjacent the central plane of rotation, with one of said contacts on one side of said central plane, and the other contacts on the other side of said central plane. This motion of the holders can be considered a planetary motion, in which the axis of each planet is inclined at an acute angle to said central plane of rotation.

Another feature of some embodiments of the invention is the use of thrust rings with spherical inside surfaces which float and do not center. They let the centering be done by the two pairs of rollers.

Reference will now be made to the drawings for a more detailed description of the invention. The embodiment of Figs. 1 to 6 inclusive will be described first.

In this embodiment of the invention, the two end members of the joint are designated at 20 and 21, respectively. In Fig. 1 the two end members are shown at zero position of shaft angularity, that is, with their respective axes 22 and 23 in alignment. 23' denotes one position which the axis 23 may occupy in operation of the joint.

Motion between the two end members is transmitted through two connecting members or holders 25 and 26. Each of these connecting members or holders carries a pair of coaxial rollers 27. The axis 29 of the rollers 27 carried by holder 25, and the axis 30 of the rollers 27 carried by holder 26 both intersect the axis 22 in the same point O at which the axes 22 and 23 of the two end members intersect.

The rollers 27 have preferably conical or substantially conical outside surfaces whose apex is at O. A slight easeoff may be provided, however, at the ends of the rollers so that the profile in an axial section is very slightly convex.

The rollers 27 are shown as mounted upon the holders 25 and 26 through tapered needle bearings 32, but they may be mounted in other ways, for instance, on plain bearings. The two connecting members are formed so that they may pass each other, each being bent, as clearly shown in Fig. 1, so that it will not interfere with the other in the central plane of the joint.

The holders 25 and 26 are provided with raceways 33 for each set of needles 32. The needles are held against outward axial displacement by a shoulder 34 formed on each holder at the outer end of the raceway 33. Each set of needles is held against inward axial displacement with reference to its holder by a snap ring 35 (Fig. 1) which is supported by a shoulder 36 formed on the holder. The race surface 33, the inside surface 37 of each roller, and the needles 32 converge preferably to a point 38 (Figs. 1 and 5) beyond the apex O of the outside surface 39 of the roller. The purpose of this will be described further hereinafter.

Only one of the rollers 27 and its mounting has been shown in detail. However, the other rollers 27 are similarly constructed and mounted.

In the embodiment of the invention shown in Figs. 1 to 6 inclusive, each connecting member 25 and 26 is made in two parts 25', 25" and 26', 26", respectively, which are rigidly secured together by conventional face coupling teeth 40 and a headed connecting screw 41. Each screw 41 is mounted in a bore and counter-bore provided in the outer end 25' or 26', respectively, of the associated holder 25 or 26 and threads into the associated inner part 25" or 26", as the case may be, of the respective holder 25 or 26.

The end member 21 is formed in the embodiment shown in Figs. 1 to 4 with four integral arms 45 which stem from the shaft portion 49 of the end member 21 and which are united at their outer ends by the integral portion 50 (Fig. 1). These arms have opposite side surfaces 55 which form ways for the rollers 27. The ways 55 are such as are enveloped by a conical roller surface when the axis of a conical roller 27 is turned about the apex O on an axis perpendicular to the axial plane in which the axis 29 or 30 (Fig. 2) of the roller lies. The ways 55 constrain the roller axes to move about the center O in axial planes of the end member 21. The construction of the connecting members in two parts permits the arms 45 to be secured together by integral portion 50 at their ends opposite the shaft portion 49 of the end member 21 to increase the strength of the end member.

Connecting member 25 is connected with the end member 20 in such a way that it can tilt relative to the central plane of rotation of this end member, that is, connecting member 25 is mounted to tilt relative to the plane which passes through the point O and is perpendicular to the axis 22 of the end member 20. As the connecting member 25 tilts, the axis 29 of the rollers 27, which are mounted on that connecting member, moves in said plane about the apex O relative to the end member 20. Similarly the connecting member 26 is mounted to tilt relative to the plane which passes through point O and is perpendicular to axis 22, and as the connecting member 26 tilts, the axis 30 of the rollers 27, which are mounted on connecting member 26, moves in said plane about the apex O relative to the end member 20. More broadly, the roller axes 29 and 30 move in a direction tangent to said plane near the middle position of oscillation of the axes 22 and 23.

For the purpose of controlling the tilting movement, connecting member 25 is provided adjacent opposite ends with enlarged portions 56. These are disposed outwardly of the rollers 27 and are provided with lateral projections 60 (Figs. 1 and 4), which carry pivot members 61. The common axis 62 of the pivot members 61 passes through the point O, lies in the plane of the drawing of Fig. 1, and is inclined at an acute angle to the roller axis 29. One of the projections 60 is disposed outwardly of one roller 27 at one side of the plane perpendicular to axis 22 and passing through apex O; and the other of the projections 60 is disposed at the opposite side of said plane, and outwardly of the other roller 27 of connecting member 25. A sliding block 64 is integral with each of the pins 61 and straddles the associated projection 60. The block 64 at one side of the apex O has plane outside surfaces 63 which engage opposite sides of a slot 65 formed in a ring-shaped part 67 which is secured to the end member 20. The block 64 at the opposite side of apex O engages the opposite sides of a slot 65' formed in the enlarged portion 66 of end member 20 itself. Each of the two blocks 64 has spaced arcuate concave cylindrical surfaces 69 (Fig. 3) which are coaxial with axis 62 and which engage convex cylindrical arcuate surfaces 71 formed on associate projection 60.

Each projection 60 has a convex outer surface 68 centered on or near the roller axis 29 and engaging the outer bottom surface 73 of the associated slot 65 or 65', as the case may be. The surfaces 68 may be arcuate conical surfaces whose axis is at 29. The ring-shaped member 67 is secured to the end member 20 by face coupling teeth 70 (Figs. 2 and 4) and screws 72 which thread into the member 20.

On the side of the roller axis 29 opposite each of the projections 60, the connecting member 25 is formed with convex surfaces 75. These surfaces may also be arcuate conical surfaces coaxial with axis 29. Each such surface 75 engages with two spaced conical rollers 76. These rollers are mounted in connecting frames 77. Each pair of rollers 76 bears on the surface 75 and also on a peripheral guide surface 78 or 78', respectively, formed on the members 67 and 20, respectively. The connecting frame 77 keeps the rollers together. One set of rollers 76 is disposed diagonally opposite the other set of such rollers, and one pivot member 61 is disposed diagonally opposite the other pivot member 61 at the opposite side of center O and at the opposite side of axis 29 as will be seen from Figs. 1 and 4. The opposite engagements of the connecting member 25 through surfaces 68 of projections 60 and convex surfaces 75, with the bottoms of slots 65, 65' and with the rollers 76, respectively, constrain the roller axis 29 to stay in the central plane of rotation of the end member 20. The engagement of the blocks 64 with the sides of the slots 65 and 65' constrain the connecting member 25 to turn as its roller axis moves in said central plane about center O. It turns instantaneously about an axis inclined to said central plane of rotation so that it tilts relative to said plane. In the middle position of oscillation, the instantaneous axis of tilt coincides with the pivot axis, as is readily understood.

The purpose of each pin 61 is to carry each sliding block 64 along as it moves slightly depthwise of the slot 65 or 65' without causing one-sided pressures between the main bearing surfaces of the sliding block and the surface 71. Other suitable block constructions may also be used.

Connecting member 26 is mounted on the end member 20 like the connecting member 25 and is subjected to the same constraint. It has two enlarged portions 56a adjacent opposite ends which have projections 60a, that are diagonally disposed, respectively, with reference to each other at opposite sides of axis 30 and of axis 22, and which have convex surfaces 75a at opposite sides of axis 30. The projections 60a have blocks 64a pivoted on them which engage in slots 65a and 65'a, respectively, in ring-shape member 67 and ring shaped portion 66 of end member 20, respectively. Each projection 60a has a convex surface 68a riding on the bottom of associated slot 65a or 65'a. Each convex surface 75a engages a pair of rollers 76a carried by a carrier 77a similar to rollers 76 and carrier 77 previously described. Rollers 76a of one carrier 77a ride on surface 78 of ring-shaped member 67; and rollers 76a of the other carrier 77a ride on surface 78' of ring-shaped portion 66 of end member 20.

Each connecting member has, therefore, a pair of diagonally opposite sliding blocks mounted on coaxial pivots or hinges. One block of each pair of blocks engages a slot provided in end member 20 while the other block of the pair engages a slot in the part 67 which is rigid with the end member 20. When a connecting member 25 or 26 moves relative to the end member 20 it does so in a definite constrained motion. It moves at any one instant about an axis inclined to the axis of the end member 20, thereby tilting relative to said plane. The said instantaneous axis is inclined at an acute angle to the roller axis, an angle which preferably is kept below 30°. In this way the driving pressure is taken up at a point near the roller axis, which receives it. The combined motion of the connecting member about axis 22 and about the inclined axis, such as axis 62 in the case of member 25, can be considered a planetary motion.

In accordance with the present invention the two connecting members 25 and 26 also engage each other to keep the balance between them. The purpose of this engagement is to enforce equal and opposite motions on the two connecting members with respect to the end member 20. When one connecting member moves in one direction relative to end member 20, the other connecting member should move in the opposite direction and the same amount. In the embodiment shown in Figs. 1 to 6 inclusive the connecting member 25 is provided at one end with an arm 81 (see left half of Fig. 4) that projects laterally from one of its enlarged portions 56 in the peripheral direction, and that carries a roller 80. At its opposite end (see right half of Fig. 4), the connecting member 25 is provided with a furcated portion comprising arms 83 and 84 which project laterally from the other enlarged portion 56 of the connecting member in the peripheral direction, and which are spaced apart, and which together bound a slot 82. The connecting member 26 is similarly provided at one end with a pair of arms 83' and 84', which bound a slot 82', and at its opposite end with an arm 81' which carries a roller 80'. Roller 80 engages in a slot 82' between the arms 83' and 84'. Roller 80' engages in a slot 82 between the arms 83 and 84. The slots 82 and 82' are identical in shape. Their shape is determined to produce equal motion of the two connecting members in opposite directions. Given the motion of the two connecting members 25 and 26 with respect to the end member 20, the relative positions of the two connecting members may then be drawn or computed for a plurality of equal and opposite turning positions. Thereby the shape of the slots 82, 82', are obtained as the envelope of a plurality of relative roller positions. A large enough number of relative positions are determined to obtain a smooth slot. In the middle position the engagement between the two connecting members is adjacent the central plane of rotation, and the roller axis is near said plane.

A roller 80 might be put on each of the two arms of one holder and a slot on each of the two arms of the other holder, but preferably the two roller holders are identical with each other as shown in the embodiment of Figs. 1 to 4. Each holder has two arms provided, respectively, at opposite ends of the holder. One arm carries a roller similar to the roller 80 of Fig. 4 which engages in a formed slot provided in the adjacent arm of the other holder. The holders are then alike and interchangeable.

The joint of Figs. 1 and 2 is enclosed to retain the lubricating grease by a sleeve 102. The sleeve 102 is threaded onto the part 67 and has a flexible seal 104 bonded thereto at one end. This seal or boot 104 prevents entry of dirt or grease into the joint. The seal 104 is of known construction. A gasket 103 is also used with this sleeve, being interposed between the opposite end of the sleeve and end member 20.

The operation of the embodiment of the invention illustrated in Figs. 1 to 6 inclusive will be understood from the preceding description, but may be briefly summed up here. At shaft angularity uniform motion of end member 21 will cause the roller axis 29 to move about the axis 22 of the end member 20 at a varying rate, the variations increasing with increase in shaft angularity. The variations repeat with every half turn. The departure from uniform motion is essentially harmonic, that is, it varies essentially like sin $2\theta$, where $\theta$ is the turning angle from a given zero position. The roller axis 30 moves likewise, but not at the same time. Its position corresponds to a turning angle $\theta'$ which is 90° different from the turning angle $\theta$. This is because the ways engaged by the pair of rollers 27 carried by connecting member 26 are 90° from the ways engaged by the pair of rollers 27 carried by connecting member 25.

$$\text{Sin } 2(\theta+90°)=\sin (2\theta+180°)=-\sin 2\theta$$

Accordingly when the departure from uniform turning position is proportional to sin $2\theta$ for the roller axis 29, the departure for the roller axis 30 is proportional to $-\sin 2\theta$ at the same moment. If holder 25 tends to move up, holder 26 tends to move down. If one turns in one direction, the other is bound to turn in the opposite direction of rotation. The departures from uniform motion position of the two roller axes are opposite and essentially equal. The average motion of the two is very nearly uniform.

Furthermore, if we consider the pivots 61a, 61 which appear below the plane 88 of rotation of end member 20 in Fig. 4, the holder 25, 26 tend to turn counterclockwise about these pivots under load from right to left, but because of the connection between the two holders, when one of them tends to turn counterclockwise it also tends to turn the other holder clockwise. Therefore the torque of one holder balances the torque of the other.

If we imagine that there were no operative connection between the two holders, then when both end members 20 and 21 of the universal joint were turned at a uniform rate, the roller axes 29, 30 would move periodically about the pivot axes 62, 62' (Fig. 4). This motion would substantially repeat for every half turn, like the motion transmitted in a Cardan joint. The two roller axes have the same motion but not at the same time. There is, as stated above, a phase difference of 90 degrees caused by the fact that the engaged ways 55 of end member 21 are 90° apart. As this difference is half of the total cycle, the motions of the two roller axes about the pivot axes are in opposite phase. As one advances, the other one lags back. The operative connection 80—82', 80'—82 between the two holders 25, 26 causes their average motion to be transmitted to the end member 20 on which the holders are pivoted. As stated above this motion is very nearly uniform.

The end member 20 has the average motion of the roller axes of the two connecting members. The interconnection is such that an advance of one is made up by an equal lag of the other. Therefore the motion of the end member 20 is uniform to a very high degree. End member 21 transmits essentially uniform motion to end member 20; and end member 20 transmits essentially uniform motion to end member 21.

The holders 25 and 26 have a scissoring motion relative to each other under actuation of the ways 55 of end member 21 as the end member 21 rotates relative to end member 20 and as they revolve about axis 22 of end member 20; and they have also tilting motions about inclined axes 62, 62' as they revolve.

One of the rollers 27 is shown separately in Figs. 5 and 6. It will now be demonstrated why the inner surface 37 of the roller has an apex 38 beyond the apex O of the outer roller surface 39. Straight line 90 represents the force exerted on the outer roller surface. It is perpendicular to the outer roller surface 39 and intersects the roller axis 29 at 91. This force is resisted by a reaction equal and opposite to it which acts on the inner roller surface 37. The inner roller surface receives the pressures of the individual needles of which each component passes through the roller axis 29 or 30 and is perpendicular to the inner roller surface 37. Some of these individual pressures are indicated by arrows 92, 92', 92" in Fig. 6. The individual pressures are a maximum at the middle at 92 and gradually diminish toward both sides. In Fig. 5 the pressure component 92 is and appears perpendicular to the axial profile 37 of the inner roller surface, but the other components would appear more inclined in this figure. They include a constant angle with the roller axis 29, 30 and constitute elements of a conical surface coaxial with the roller. They project in Fig. 5 like such elements. Accordingly the resultant of all the pressure components is more inclined than the central component 92. It is represented by vector 94 in Fig. 5.

With the apex 38 beyond apex O, the resultant force 94 is less inclined than the force 90 exerted on the outer roller surface. The reaction 94 therefore does not quite balance the force 90. It takes an additional axial force 95 to maintain the balance.

The axial force, considered alone, is the uniform reaction of all the needles 32 when in the direction shown. It is the reaction obtained when the roller is pressed back axially toward its large end. This kind of reaction is aimed at in order to hold the roller securely on its entire circumference. Accordingly with tapered rollers mounted in accordance with this description, each tapered roller under load is securely held by its single bearing surface 37.

Another feature of my mounting is the provision of needles and bearing portions which extend outside of the spherical surface 96 (Fig. 5) which contains the outside circle 97 of the working surface 39 of the roller. Spherical surface 96 has its center at apex O of the working surface of the roller, that is, of its outside surface. In this construction the needles and races carry less concentrated loads at their outer portions. The loads are more nearly equally distributed over the entire lengths of the needles.

What has been described for tapered rollers with tapered needle bearings also applies to tapered rollers mounted on plain bearings. One such tapered roller 27' and its mounting are shown in Fig. 7. Here the inner surface 37' of the roller is also centered at a point 38' beyond the apex O of the outer surface 39' of the roller. Here, also, the tapered inner bearing surface 37' of the roller extends outwardly beyond the spherical surface 96' containing the outer end of the working surface 39' of the roller and centered at apex O of said working surface. Here, also, the tapered roller under working load is securely held all around its periphery by the bearing surface.

Fig. 8 shows another way of mounting a tapered roller, here indicated at 27". The roller 27" is mounted in more conventional manner on a cylindrical surface 97 of a connecting member 25' or 26', similar to connecting members 25 and 26; and the roller 27" abuts at its back against a plain surface 98 perpendicular to the axis of the roller.

While ordinarily mountings such as shown in Figs. 5 to 7 inclusive are preferred, any suitable known mounting may be used.

In the modification of the invention shown in Fig. 9 each of the two roller holders 125 and 126 is formed as a single piece. The toothed coupling 40 of Figs. 1 and 2 is eliminated. A holder is first made in two parts. Then a roller 27 is mounted on antifriction or plain bearings on each of the two parts; and the two parts are then welded together in a suitable fixture so as to give a single integral holder. The rollers are permanently mounted on the holders; and they cannot be replaced individually. In case of failure of any portion or part on the holder the whole holder is replaced. The holders are operatively connected with the end member 20 in the manner described above. The other end member, here denoted at 121 has arms 145 which are spaced apart at their outer ends, that is, not connected. This permits assembly of the roller holders. The arms 145 contain the ways 155 which are engaged by the tapered rollers 27.

Figure 10:
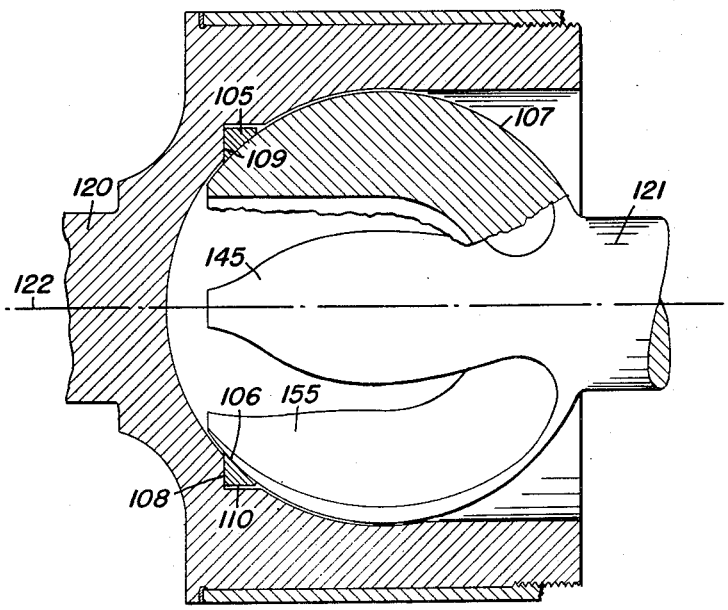
Fig. 10 is an axial section of the two end members of a universal joint constructed according to a further embodiment of this invention, the inner end member being shown partly in elevation, and the axial section being taken through the jaws of the inner end member.

In the embodiment of Fig. 9 the end member 120 is made in two parts which are rigid with one another as described with reference to the embodiment of Figs. 1 to 5. In the embodiment of Fig. 10 the end member 120 is in one piece. In this case built-up roller holders are used as shown in Figs. 1 and 2 for reasons of assembly. End member 121 of Fig. 10 is like the correspondingly numbered end member in Fig. 9; it has the outer ends of its arms 145 unconnected.

With the embodiments of the invention heretofore described the two end members 20 and 21 (Fig. 1), 20, 121 (Fig. 9) are maintained against axial displacement so that there will be no axial displacement with reference to the center point O of either end member. Ordinarily the loads, which, may tend to move to two end members axially with respect to one another, are relatively small. It is then possible to keep the two end members pressed together axially by a spring. The spring is not shown and may be at any point away from the center O of the joint. Existence of such spring pressure has been assumed in the embodiments of Figs. 1 to 4, 9 and 10. It is then sufficient to provide bearing surfaces for a moderate one-sided pressure only.

In Fig. 1 I have shown a part 99 inserted into end member 20 to take this axial thrust. It has a concave spherical surface 100 with which it bears against a convex spherical surface 101 on end member 20. It may be made of a graphite-containing material.

In Figs. 9 and 10 I have provided a ring 105 for this purpose. It has a concave spherical surface 106 engaging the convex spherical outside surface 107 of the end member 121 which has a ball head. The ring 105 has a plane rear face 108 which bears against a plane shoulder 109 provided on the end member 120 and which is perpendicular to the axis 22 or 122 of said end member. The peripheral surface 110 of the ring 105 is spaced from the confronting surface of the counterbore in the member 120 in which the ring is seated. With this provision the ring holds the end member 121 with the ball head axially in one direction without centering it. This is done on purpose. The four rollers 27 center this end member through their driving engagement with the ways 155 formed on the arms 145. Additional centering is a disadvantage since the centering one way may not be absolutely identical with the centering the other way. The rollers 27 themselves are held on the roller holders which are constrained to move about the apex O of the end member 20 or 120.

Figure 11:
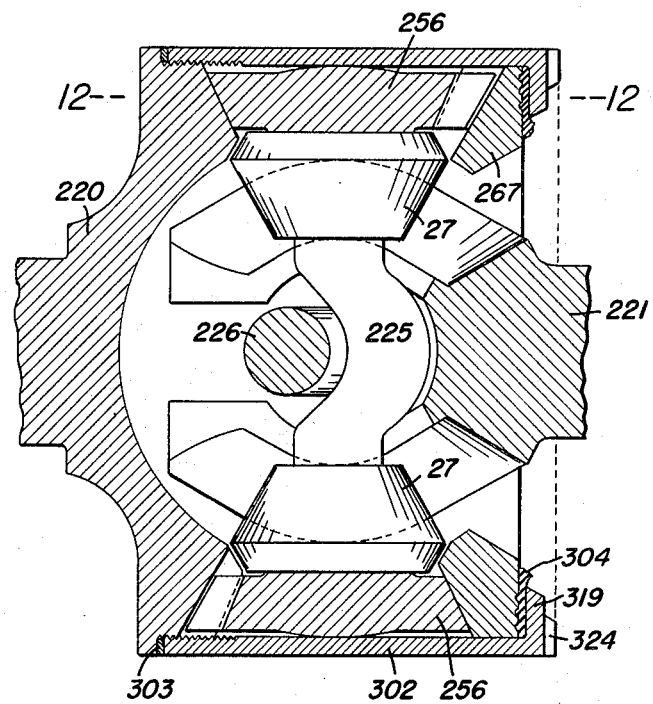
Fig. 11 is an axial section, similar to Figs. 1 and 9, illustrating a still further embodiment of the invention.
Figure 12:
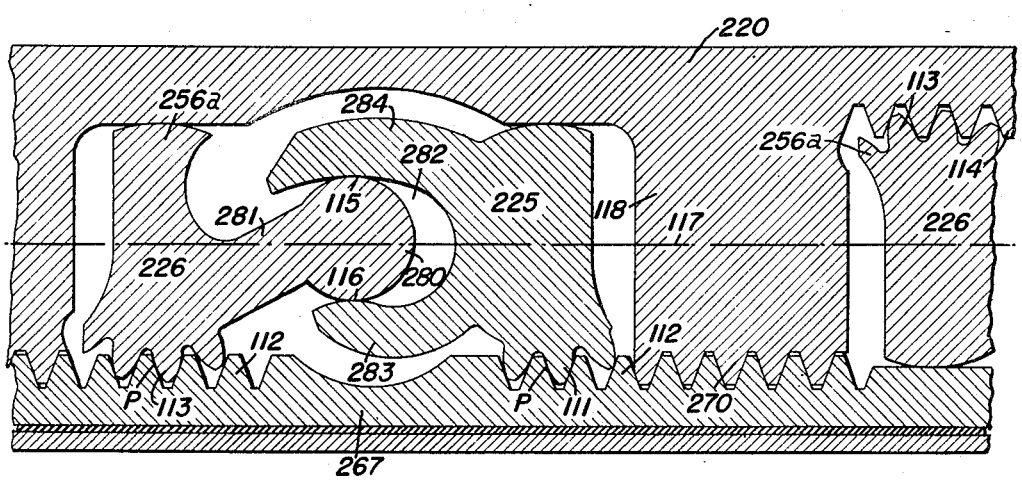
Fig. 12 is a somewhat diagrammatic developed cylindrical section taken along the line 12—12 of Fig. 11 and coaxial with the left-hand end member of the joint.

Still another embodiment of the invention is illustrated in Figs. 11 and 12. Here one end member 220 is made in two parts, one of which comprises a ring member 267. The engagement between the roller holder 225 and the end member 220 is here not through pivot blocks but through gear teeth 111 on the enlarged portions 256 at opposite ends of the connecting member 225 and gear teeth 112 and 114 on the ring-shaped member 267 and the end member 220, respectively; and similarly the engagement between the roller holder 226 and the end member 220 is through gear teeth 113 on the enlarged portions 256a of the connecting member 226 and gear teeth 112 and 114 on the member 267 and end member 220, respectively.

In Fig. 12 it is assumed that the driving pressure exerted on the rollers in forward motion is from right to left. The teeth 111, 113 are preferably so positioned that contact is at the pitch points P of the engaging teeth when the joint axes are in the middle point of swing. At this point true rolling takes place.

The two holders 225 and 226 engage each other for the same purpose as described above with reference to holders 25 and 26. Each holder has spaced arms 283 and 284 at one end engaging a rounded projection 280 carried by an arm 281 at the corresponding end of the other holder. Arm 281 has a circular end portion 280; and the adjacent arm of the other holder contains a formed slot 282 engaged by the portion 280. Again the engagement between the two holders is adjacent the central plane of rotation of the end member 220. In the middle position of the swinging motion, the engagements 115, 116 are on opposite sides of the mean plane of rotation 117 of the end member 220. This plane of rotation also contains the roller axes. The slots 282 are preferably so positioned that in forward driving the pressure is on the side 115 where the slot is concave.

The gear teeth 112 of the part 267 also serve as coupling teeth. These coupling teeth are kept pressed against the mating coupling teeth 270 of the projection 118 of end member 220 by the flange 319 of the threaded sleeve 302. Its thread engages a thread formed in the end member 220. A flexible seal 304 is secured to the part 267 by clamping in between this part and flange 319. Face teeth 324 on the end of the sleeve 302 provide a grip for turning this sleeve. The seal 304, together with the gasket 303, retain the lubricant at the working parts and prevent it from leaking out.

Universal joints for high speed operation should be mass balanced to avoid inertia loads and inertia moments. This is especially true for the middle position, that is, for the position with shafts aligned. For this position dynamic mass balance is achieved as for other rotating parts and requires no description.

The invention can also be practiced with cylindrical rollers in place of the conical rollers shown. Also sliding blocks may be substituted for the rollers, either the conventional type with parallel plane sides, or sliding blocks whose working surfaces are counterparts of the side surfaces of the grooves of the end member 21, 121, or 221 with the ball head. In this case the sliding blocks are tapered in cross section and concave lengthwise. Their working surfaces are concave conical surfaces matching the convex-conical surfaces of the ways. Indeed the same motion can also be transmitted without rollers or sliding blocks. The holders are then provided with conical or cylindrical surfaces identical with the outside surfaces of the rollers.

While the invention has been described in connection with several different embodiments thereof, it will be understood that it is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth, and as fall within the scope of the invention or the limits of appended claims.

Having thus described my invention, what I claim is:

1. A universal joint comprising two end members having intersecting axes, one of which is provided with a plurality of slots, opposite sides of said slots forming ways, a plurality of holders, a plurality of parts engaging said ways and rotatably mounted on said holders for rotation on axes extending transversely of and substantially perpendicular to the axis of the other end member, and means constraining each holder to move relative to said other end member about the axis of said other end member in a plane perpendicular to the axis of said other end member and about an axis perpendicular to the axis of said other end member.

2. A universal joint comprising two end members having intersecting axes, one of which is provided with a plurality of slots, opposite sides of said slots forming ways, a plurality of holders, a plurality of pairs of parts engaging in the several slots, said parts being adapted to engage said ways on opposite sides for transmitting torque in opposite directions, each pair of parts being rotatably mounted on one of said holders for rotation on a common axis perpendicular to the axis of the other end member of the joint, means for mounting each holder on said other end member for movement about an axis angularly disposed to the axis of said other end member, and means constraining each of said angularly disposed axes to tilt slightly in an axial plane of said other end member, said constraining means comprising a pair of interengaging parts, one of which is a guide member and the other of which is a slot engaged thereby, one of each pair of said interengaging parts being on each holder and the other of each pair of interengaging parts being on the other end member.

3. A universal joint for transmitting motion between two end members having angularly disposed and intersecting axes, comprising two operative connections disposed in parallel between said end members so that only a portion of the power transmitted between said end members is transmitted through one of said operative connections and the remaining portion is transmitted through the other operative connection, said connections comprising a pair of holders, a part rotatably mounted on each holder for rotation on an axis radial of the point of intersection of the axes of said end members, all of said parts being in engagement with one of said end members, means constraining each holder to move relative to said other end member about the axis of said other end member in a plane perpendicular to the axis of said other end member and about an axis perpendicular to the axis of said other end member, the holders being operatively interconnected to tilt simultaneously in opposite directions 4. A universal joint for transmitting motion between two end members having angularly disposed and intersecting axes, comprising two operative connections disposed in parallel between said end members so that only a portion of the power transmitted between said end members is transmitted through one of said operative connections and the remaining portion is transmitted through the other operative connection, said connections comprising a pair of holders, four equally spaced ways on one of said end members, a pair of rollers mounted on each of said holders for rotation on a common axis passing through the point of intersection of the axes of said end members, each of said holders comprising two parts rigidly secured together, said connections further comprising means constraining each holder to move relative to said other end member about the axis of said other end member in a plane perpendicular to the axis of said other end member and about an axis perpendicular to the axis of said other end member, and means connecting said holders so that they move simultaneously in opposite directions about the axis of said other end member and said axis perpendicular thereto.

5. A universal joint for transmitting motion between two end members having angularly disposed and intersecting axes, comprising two operative connections disposed in parallel between said end members so that only a portion of the power transmitted between said end members is transmitted through one of said operative connections and the remaining portion is transmitted through the other operative connection, said connections comprising a pair of holders, four ways provided on one of said end members and equi-spaced about the axis of said one end member, a pair of parts rotatably mounted on each holder for rotation about an axis extending through the point of intersection of the axes of said end members, said parts engaging said ways, said connections further comprising means constraining each of said holders to move relative to the other end member about the axis of said other end member in a plane perpendicular to the axis of said other end member and about an axis perpendicular to the axis of said other end member, and a roller mounted on one of said holders, the other holder being provided with a way which is engaged by said roller, said way being shaped to constrain said holders to simultaneously perform their motions in opposite directions.

6. A universal joint for transmitting motion between two end members that have angularly disposed and intersecting axes, comprising two operative connections disposed in parallel between said end members, each of said connections comprising a holder, a part rotatable on each holder about an axis passing through the point of intersection of the axes of said end members, each said part contacting with one of said end members, and said holders having intermeshing engagement with each other to transmit turning motion from one to the other, each of said holders also having pivotal engagement with the other of said end members at two diametrically opposite points offset in opposite directions from the central plane of said other end member, said central plane being perpendicular to the axis of said other end member and passing through said intersection point.

7. A universal joint, comprising two end members having angularly disposed and intersecting axes, one of said end members having a plurality of pairs of ways, a pair of holders, a pair of rollers engaging each pair of ways, each pair of rollers being rotatably mounted on one of said holders for rotation on a common axis, and means connecting each holder to said other end member to move relative to the other end member about an axis obliquely inclined to the axis of said other end member, and a slot and guide means on each holder and said other end member, respectively, to constrain said obliquely inclined axis to move slightly in an axial plane of said other end member, whereby said common axis stays perpendicular to the axis of said other end member, and means connecting to each other to constrain each other to move oppositely with respect to said other end member.

8. A universal joint comprising two end members having intersecting axes, one of which is provided with a plurality of slots spaced angularly about its axis, opposite sides of said slots forming ways, a pair of holders disposed crosswise of one another, each of said holders having parts at opposite sides of the point of intersection of said axes engaging said ways, each of said holders having other parts disposed outwardly of the first-named parts and connecting said holders to the other end member for pivotal movement about an axis obliquely inclined to the axis of said other end member, and means connecting said holders at their opposite ends to one another to constrain them to pivot simultaneously in opposite directions, thereby to move the axes of said parts in opposite directions relative to one another.

9. A universal joint comprising two end members having intersecting axes, one of which is provided with a plurality of slots equi-angularly spaced about its axis, opposite sides of said slots being conical surfaces and forming ways, a pair of holders disposed crosswise of one another, a pair of conical rollers mounted on each of said holders at opposite sides of the axis of the other end member, each of said rollers engaging in one of said slots to move on the ways of the slot, each holder having conical raceways for the associated rollers, the cone angle of said raceways being less than the cone angle of the outside surfaces of said rollers, and the cone apex of said raceways being disposed beyond the cone apex of the outside surfaces of said rollers, and means connecting said holders to said other end member.

10. A universal joint for operatively connecting two end members which have intersecting axes, comprising a plurality of holders pivotally mounted on one of said end members on pivot axes inclined to and intersecting the axis of said one end member in a common point, the other end member being provided with ways, means connecting said holders operatively to one another to turn on their pivots simultaneously in opposite directions, and parts rotatably mounted on said holders and engaging said ways.

11. A universal joint for operatively connecting two end members which have intersecting axes, comprising a plurality of holders pivotally mounted on one of said end members on pivot axes inclined to and intersecting on the axis of said one end member in a common point, the other end member being provided with ways, means operatively connecting said holders to one another to turn on their pivots simultaneously in opposite directions, and rollers rotatably mounted on said holders and engaging said ways.

References Cited in the file of this patent

UNITED STATES PATENTS

| | | |
|---|---|---|
| 1,625,410 | De Ram | Apr. 19, 1927 |
| 1,935,926 | Wolf | Nov. 21, 1933 |